United States Patent
Kim et al.

(10) Patent No.: US 9,697,360 B2
(45) Date of Patent: Jul. 4, 2017

(54) SYSTEM AND METHOD FOR CHANGING SECURE BOOT AND ELECTRONIC DEVICE PROVIDED WITH THE SYSTEM

(71) Applicant: Samsung Electronics Co., Ltd., Gyeonggi-do (KR)

(72) Inventors: Yo Hwa Kim, Gyeonggi-do (KR); Michael Pak, Seoul (KR); Chan Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 23 days.

(21) Appl. No.: 14/587,335

(22) Filed: Dec. 31, 2014

(65) Prior Publication Data

US 2015/0186651 A1 Jul. 2, 2015

(30) Foreign Application Priority Data

Dec. 31, 2013 (KR) ........................ 10-2013-0167999

(51) Int. Cl.
*G06F 21/57* (2013.01)
*G06F 21/74* (2013.01)
*G06F 12/14* (2006.01)

(52) U.S. Cl.
CPC ............ *G06F 21/575* (2013.01); *G06F 21/74* (2013.01); *G06F 12/1425* (2013.01)

(58) Field of Classification Search
CPC ..... G06F 21/575; G06F 21/74; G06F 12/1425
See application file for complete search history.

(56) References Cited

U.S. PATENT DOCUMENTS

| | | | | |
|---|---|---|---|---|
| 2003/0026427 A1* | 2/2003 | Couillard | ............. | H04L 9/0822 380/277 |
| 2004/0243805 A1* | 12/2004 | Enokida | ............. | H04L 63/0823 713/175 |
| 2006/0090084 A1* | 4/2006 | Buer | ...................... | G06F 21/53 713/189 |
| 2007/0022243 A1* | 1/2007 | Rudelic | ............... | G06F 12/1433 711/103 |
| 2009/0144559 A1 | 6/2009 | Lee et al. | | |
| 2010/0202608 A1* | 8/2010 | Furuhashi | ............. | H04L 9/0894 380/44 |
| 2012/0284534 A1* | 11/2012 | Yang | ...................... | G06F 21/77 713/193 |
| 2013/0111203 A1* | 5/2013 | Baltes | ..................... | G06F 21/57 713/100 |
| 2014/0359268 A1* | 12/2014 | Jauhiainen | ................ | H04L 9/08 713/2 |

FOREIGN PATENT DOCUMENTS

GB 2514771 A * 12/2014 ............... H04L 9/08

* cited by examiner

*Primary Examiner* — Robert Leung
(74) *Attorney, Agent, or Firm* — The Farrell Law Firm, P.C.

(57) ABSTRACT

A system and method for changing authority for a secure booting operation and an electronic device thereof are provided. The system includes a memory including a plurality of key bit areas in each of which a root key can be received, and a processor core configured to input a new root key to one of the plurality of key bit areas of the memory in response to an external input.

13 Claims, 6 Drawing Sheets

SYSTEM AND METHOD FOR CHANGING SECURE BOOT AND ELECTRONIC DEVICE PROVIDED WITH THE SYSTEM

PRIORITY

This application claims priority under 35 U.S.C. §119(a) to Korean Patent Application No. 10-2013-0167999, which was filed in the Korean Intellectual Property Office on Dec. 31, 2013, the entire content of which is incorporated herein by reference.

BACKGROUND

1. Field of the Invention

The present invention generally relates to a system and method for changing a secure boot and an electronic device provided with the system.

2. Background of the Related Art

A computing system executes a boot image to initialize devices, and uses a secure boot chain to check whether codes are falsified by verifying a digital signature value of the boot image. However, a secure boot structure is currently designed such that a root key is determined at the time of manufacturing a system on chip (SoC) and is fused to the SoC, and thus cannot be changed later.

According to the conventional art, a manufacturer of original equipment manufacturing (OEM) products cannot generate and possess its own root of trust (RoT) for verifying a secure boot chain, and a change of the root of trust for providing a business to business (B2B) service is not allowed.

SUMMARY

The present invention has been made to solve at least the above-mentioned problems and/or disadvantages and to provide at least the advantages described below.

Accordingly, an aspect of the present invention is to provide a system and method for changing authority for a secure booting operation to allow a manufacturer of OEM products to possess its own root of trust (e.g., a public key to be a root of an arbitrary secure boot chain) to provide a B2B service, and an electronic device thereof.

According to an embodiment of the present invention, a secure boot changing system is provided, which includes a memory including a plurality of key bit areas in each of which a root key can be received; and a processor core configured to input a new root key to one of the plurality of key bit areas of the memory in response to an external input.

According to an embodiment of the present invention, a secure boot changing method is provided, which includes receiving, by a processor core, a new root key from an external input; and inputting the new root key to one of a plurality of key bit areas on a memory by the processor core.

According to an embodiment of the present invention, an electronic device is provided, which includes a secure boot changing system configured to input a new root key to one of a plurality of key bit areas in response to an external input; and a memory device configured to be booted with the new root key.

According to another embodiment of the present invention, a secure boot changing system is provided, which includes a memory including a plurality of key bit areas and a select bit area, wherein a first root key is assigned to one of the key bit areas, and a select bit is assigned to the select bit area and is set to select the first root key; and a processor configured to assign a second root key to one of remaining key bit areas other than the one of the plurality of key bit areas assigned the first root key, and to control the select bit to select the second root key. The secure boot changing system verifies a secure boot chain of the secure boot changing system when the second root key is assigned to the memory.

BRIEF DESCRIPTION OF THE DRAWINGS

The above and other aspects, features, and advantages of certain embodiments of the present invention will be more apparent from the following detailed description, taken in conjunction with the accompanying drawings, in which.

DETAILED DESCRIPTION OF EMBODIMENTS OF THE PRESENT INVENTION

Figure 1:
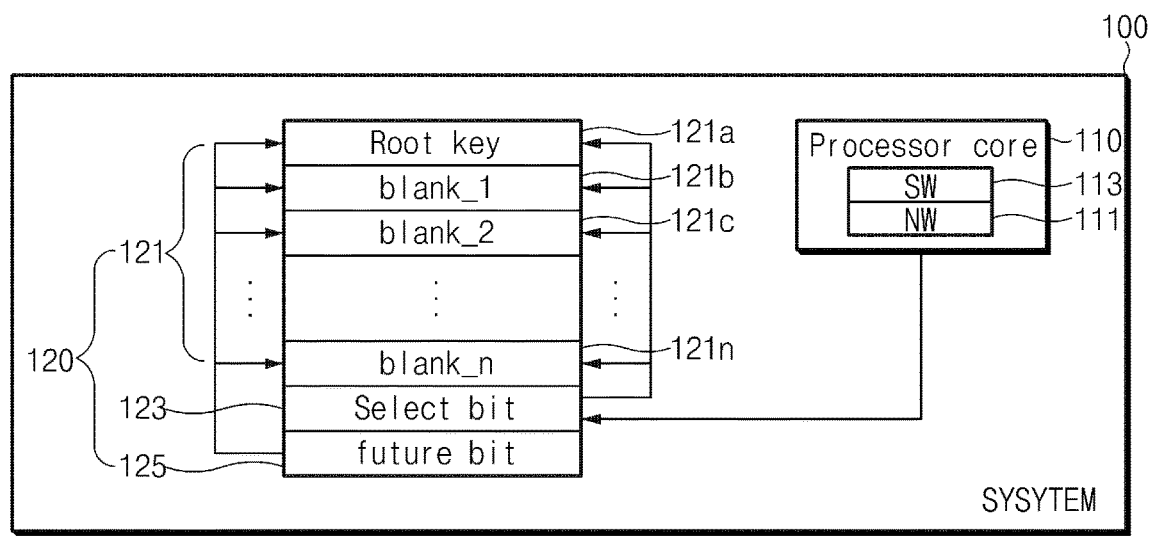
FIG. 1 is a block diagram illustrating a configuration of a secure boot changing system according to an embodiment of the present invention.

Hereinafter, the present invention is described with reference to the accompanying drawings. Various modifications are possible in various embodiments of the present invention. Thus, it is intended that the present invention covers modifications and variations of this invention, which are provided within the scope of the appended claims and their equivalents. With respect to the descriptions of the drawings, like reference numerals refer to like elements.

The terms "include," "comprise," and "have", or "may include," or "may comprise", and "may have" used herein indicate disclosed functions, operations, or elements, but does not exclude other functions, operations, or elements. Additionally, in this specification, the meaning of the terms "include," "comprise," "including," or "comprising," specifies a property, a region, a fixed number, a step, a process, an element, and/or a component, but does not exclude other properties, regions, fixed numbers, steps, processes, elements, and/or components.

The meaning of the term "or" used herein includes any or all combinations of the words connected by the term "or". For instance, the expression "A or B" may indicate include A, B, or both A and B.

The terms "1st", "2nd", "first", "second", and the like used herein may refer to various different elements of various embodiments, but are not limited thereto. For instance, such terms do not limit the order and/or priority of the elements. Furthermore, such terms may be used to distinguish one element from another element. For instance, both "a first user device" and "a second user device" indicate a user device, but indicate different user devices from each other. For example, a first component may be referred to as a second component, and vice versa, without departing from the scope of the present invention.

In the description below, when one part (or element, device, etc.) is referred to as being "connected" to another part (or element, device, etc.), it should be understood that the former can be "directly connected" to the latter, or "electrically connected" to the latter via an intervening part (or element, device, etc.). It will be further understood that when one component is referred to as being "directly connected" or "directly linked" to another component, it means that no intervening component is present.

Terms used in this specification are used to describe embodiments of the present invention, and are not intended to limit the scope of the present invention. The terms in a singular form may include plural forms unless otherwise specified.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as customary in the relevant related art and not in an idealized or overly formal sense unless expressly so defined herein.

An electronic device according to an embodiment of the present invention may have a communication function. For instance, electronic devices may include at least one of smartphones, tablet Personal Computers (PCs), mobile phones, video phones, electronic book (e-book) readers, desktop PCs, laptop PCs, netbook computers, Personal Digital Assistants (PDAs), Portable Multimedia Players (PMPs), Moving Picture Experts Group Audio Layer 3 (MP3) players, mobile medical devices, cameras, and wearable devices (e.g., Head-Mounted-Devices (HMDs) such as electronic glasses, electronic apparel, electronic bracelets, electronic necklaces, electronic accessories, electronic tattoos, and smart watches).

Hereinafter, an electronic device according to an embodiment of the present invention will be described in more detail with reference to the accompanying drawings. The term "user" in various embodiments of the present invention may refer to a person using an electronic device or a device using an electronic device (for example, an artificial intelligent electronic device).

FIG. 1 is a block diagram illustrating a configuration of a secure boot changing system according to an embodiment of the present invention.

Referring to FIG. 1, a secure boot changing system 100 (hereinafter, referred to as "system 100") according to an embodiment of the present invention may include a processor core 110 (hereinafter, referred as "processor" or "core"), and a memory 120. The memory 120 includes a plurality of key bit areas 121, a select bit area 123, and a future bit area 125. Here, the system 100 may be an application processor (AP), a microprocessor, a central processing unit (CPU), or the like. In another embodiment of the present invention, the system 100 may be a system on chip (SoC) in which a plurality of processor for performing different functions are integrated.

The processor core 110 patches instructions or data according to an external input, and processes the patched instructions or data. The processor core 110 suspends, in response to the external input, the use of a basic root key (hereinafter, referred to as first root key) written in advance and set to be applied at the time of performing a boot operation, inputs a new root key (hereinafter, referred to as second root key), and controls the memory 120 so that a process to which the new root key is applied is performed at the time of performing a boot operation. Here, a public key scheme may be used for the root keys.

For example, the processor core 110 operates in a normal world (NW) 111 to select the first root key allocated to a root key area 121a of the key bit areas 121, upon receiving a power-on signal. As illustrated in FIG. 1, the key bit areas 121 may include storage spaces 121b-121n for receiving a plurality of root keys. A manufacturer of the system 100 may write the first root key in an upper area of the key bit areas 121 at the time of manufacturing the system 100, so that the first root key is a master key for secure boot chain verification at the time of booting the system 100.

When the second root key is input, the processor core 110 switches its operation environment from the NW 111 to a secure world (SW) 113, and writes the second root key in an arbitrary area (e.g., a blank_1 area 121b) of the key bit areas 121. Here, the normal world and the secure world may be construed as operation modes or operation states of a processor according to the TrustZone technology, which is a system security technology developed by ARM. The second root key may be input by the manufacturer of the system 100 or another manufacturer related to the manufacturer of the system 100. The SW 113 of the processor core 110 changes the root key used to boot from the first root key to the second root key after the second root key is written in the blank_1 area 121b. To this end, the processor core 110 controls a select bit allocated to the select bit area 123 to select the second root key. At the time of booting the system 100, the processor core 110 switches back to the NW 111, and then performs a boot operation with the second root key. In one embodiment of the present invention, when the second root key is selected, the processor core 110 blocks (e.g., write-protect) key bit areas other than an area to which the second root key is input, e.g., a blank_2 area 121c to a blank_n area 121n, using a future bit allocated to the future bit area 125. Accordingly, the future bit prevents any other root key from being input to the blank_2 area 121c and to the blank_n area 121n of the key bit areas 121, and disables the blank_2 area 121c to the blank_n area 121n of the key bit areas 121 from being changed to other root keys. In another embodiment of the present invention, when the second root key is selected, the first root key is automatically discarded.

As described above, since the processor core 110 uses the second root key selected by a select bit at the time of booting the system, a root of trust (RoT) which is a basis for secure boot chain verification can be changed to the second root key. In this manner, an OEM manufacturer may possess its own root of trust and may thus provide a Business-to-Business (B2B) service.

In an embodiment of the present invention, the memory 120 may include the key bit areas 121 for respectively storing the plurality of root keys for authenticating a digital signature, the select bit area 123 to which a select bit for changing a root key is allocated, and the future bit area 125 for blocking the other root key areas. In another embodiment of the present invention, the memory 120 may include only some of the foregoing areas. For example, the memory 120 may include the key bit areas 121 and the select bit area 123, but may not include the future bit area 125.

The key bit areas 121 may include the root key area 121a for storing the first root key and a plurality of key bit areas 121b to 121n in which new root keys including the externally input second root key are to be written. In one embodiment of the present invention, the memory 120 may be a one-time programmable read only memory (OTPROM) disposed in a chip (e.g., an SoC). In another embodiment of the present invention, the memory 120 may be implemented with a one-time programmable (OTP) memory, a programmable read-only memory (PROM), an erasable programmable read-only memory (EPROM), an electronically erasable and programmable read-only memory (EEPROM), or a flash memory.

Figure 2:
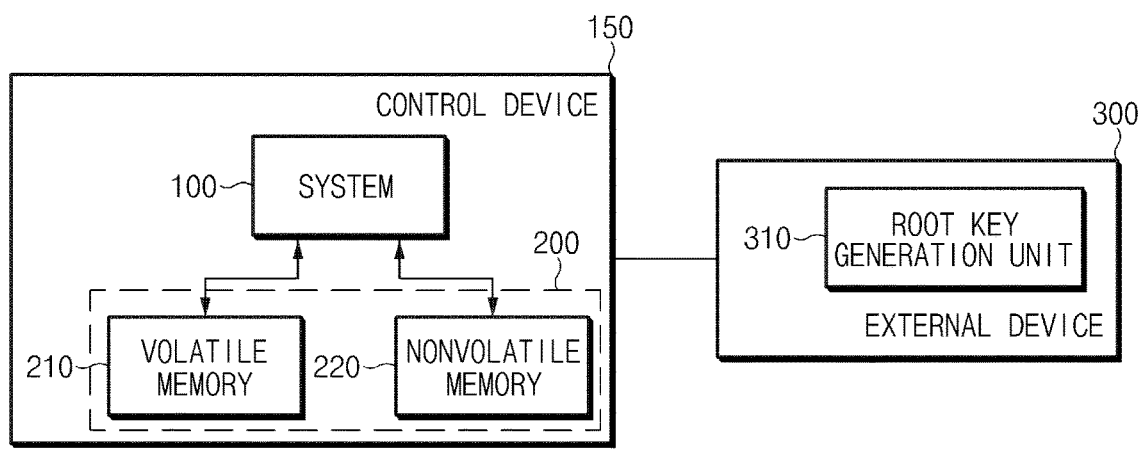
FIG. 2 is a block diagram illustrating a configuration of a control device for changing a root key and an external device according to an embodiment of the present invention.

FIG. 2 is a block diagram illustrating a configuration of a control device for changing a root key used for a boot operation and an external device according to an embodiment of the present invention.

Referring to FIGS. 1 and 2, a control device 150 according to an embodiment of the present invention includes the system 100 and a memory device 200. The memory device 200 may include a volatile memory 210 and a nonvolatile memory 220. An external device 300 connected to the control device 150 includes a root key generation unit 310.

The volatile memory 210 of the control device 150 serves as a main memory of the system 100. For example, the volatile memory 210 may be implemented with a dynamic random access memory (DRAM), a static random access memory (SRAM), a mobile DRAM, or the like. The system 100 may include a volatile memory control unit to control the volatile memory 210.

The nonvolatile memory 220 of the control device 150 stores a boot image for performing a boot operation using a root key input to the key bit areas 121. For example, the nonvolatile memory 220 may be implemented with an EEPROM, a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The system 100 of the control device 150 writes the second root key in the key bit areas 121, upon receiving the second root key from the external device 300. In this case, if the second root key is received, the system 100 may operate the SW 113 while the NW 111 of the processor core 110 is operating so that the second root key is written. Specifically, the SW 113 receives the second root key generated in the root key generation unit 310 via the nonvolatile memory 220 and via the NW 111, and writes the received second root key in the blank_1 area 121b of the key bit areas 121. The SW 113 then controls the select bit allocated to the select bit area 123 to replace the first root key with the second root key. The system 100 having a changed root key uses the second root key to verify the secure boot chain to perform a boot operation after the change of the root key.

When booting is detected after changing the root key from the first root key into the second root key, the system 100 may operate again in the NW 111 to apply the second root key at the time of performing a boot operation. The nonvolatile memory 220 may be booted using the second root key, which is input to the key bit areas 121 of the system 100.

The root key generation unit 310 generates a new root key to be written in the system 100 of the control device 150, i.e., the second root key, on the basis of a signal received through an input unit. The generated second root key may be transmitted to the SW 113 through the NW 111 of the system 100 via the nonvolatile memory 220.

As described above, according to an embodiment of the present invention illustrated in FIG. 2, the root key of the system 100 may be changed by providing the second root key from the external device 300 to the control device 150. Here, the external device 300 may be a computer or a laptop connectable to the control device 150.

Figure 3:
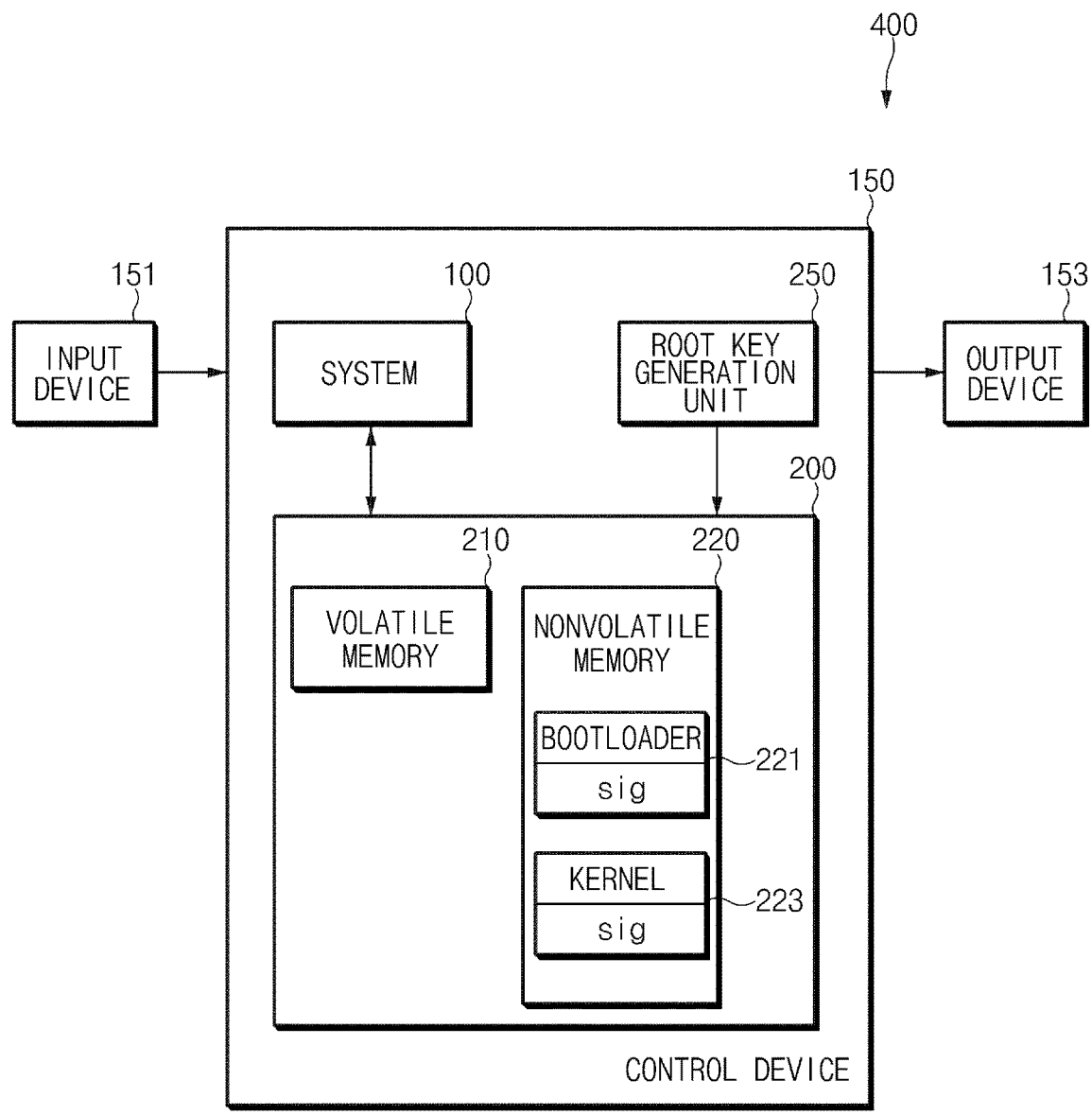
FIG. 3 is a block diagram illustrating a configuration of an electronic device that changes a root key according to an embodiment of the present invention.

FIG. 3 is a block diagram illustrating a configuration of an electronic device that changes a root key used for a boot operation according to an embodiment of the present invention.

Referring to FIGS. 1 and 3, an electronic device 400 according to an embodiment of the present invention includes an input device 151, the control device 150, and an output device 153. The control device 150 includes the system 100, the memory device 200, and a root key generation unit 250. The memory device 200 includes the volatile memory 210 and the nonvolatile memory 220. The nonvolatile memory 220 includes a bootloader 221 and a kernel 223.

The input device 151 generates a signal for changing the root key according to an input from the outside, and transmits the signal to the control device 150. The input device 151 generates a signal for the root key to be changed according to an input signal, and transmits the signal to the control device 150.

In an initial state or a default state of the system 100, the first root key may be written in the root key area 121a of the key bit areas 121 and the blank_1 area 121b to the blank_n area 121n may be empty. The select bit area 123 may be set to select the root key area 121a in which the first root key is written. When the second root key is input while the first root key is set as the root key, the system 100 may change the root key from the first root key into the second root key.

For example, when the electronic device 400 is initially booted, the control device 150 operates in a normal mode using the NW 111, performs a boot operation using the preset first root key to verify the secure boot chain on the basis of the first root key, and operates an operating system (OS) installed in the electronic device 400. If a signal for changing the root key set in the electronic device 400 is input from the outside via the input device 151 while the electronic device 400 is turned off, the control device 150 activates the SW 113 to enter and operate in a secure mode. Here, the signal for changing the root key may be different from a signal for turning on the electronic device 400. When the signal for changing the root key is input, the electronic device 400 may enter an initialization setting mode (e.g., a factory reset mode) for changing the root key.

The control device 150 operates in the secure mode to activate the root key generation unit 250. The root key generation unit 250 generates the second root key and suspends the use of the first root key. Here, the second root key may be generated by an external input, or may be randomly generated by the root key generation unit 250.

The SW 113 receives the second root key generated in the root key generation unit 250 via the NW 111, and writes the received second root key in the blank_1 area 121b of the key bit areas 121. Specifically, since the first root key is written in the root key area 121a of the key bit areas 121, the SW 113 writes the second root key in the blank_1 area 121b next to the root key area 121a. If the second root key is written in the blank_1 area 121b, the SW 113 controls (or changes) the select bit corresponding to the select bit area 123 so that the select bit selects the second root key.

If the electronic device 400 is booted while the select bit selects the blank_1 area 121b, the control device 150 activates the NW 111 to operate in the normal mode. Furthermore, the system 100 may call the second root key written in the blank_1 area 121b of the key bit areas 121 to provide the second root key to the memory device 200. Operations associated with the system 100 and the volatile memory 210 are the same as or are similar to those described above, and thus are omitted.

When the electronic device 400 is booted with the first root key, the first rook key is transferred to the bootloader 221. The bootloader 221 verifies a digital signature using the first root key, and secures the integrity of an image of the kernel 223. The kernel 223 operates an operating system on the basis of the digital signature having the secured integrity.

In one embodiment of the present invention, when the electronic device 400 is booted with the second root key, the system 100 transfers the second root key to the bootloader 221. The bootloader 221 verifies a digital signature of the image of the kernel 223 using the second root key to secure the integrity of the image of the kernel 223. The kernel 223 operates an operating system on the basis of the digital signature having the secured integrity. As described above, according to an embodiment of the present invention, the secure boot of the system 100 may be changed in the electronic device 400 without the control by an external device.

The output device 153 displays an execution screen for changing the root key executed according to the control by the control device 150. The output device 153 may include various display devices such as a liquid crystal display (LCD), an organic light-emitting diode (OLED), and a touchscreen.

Figure 4:
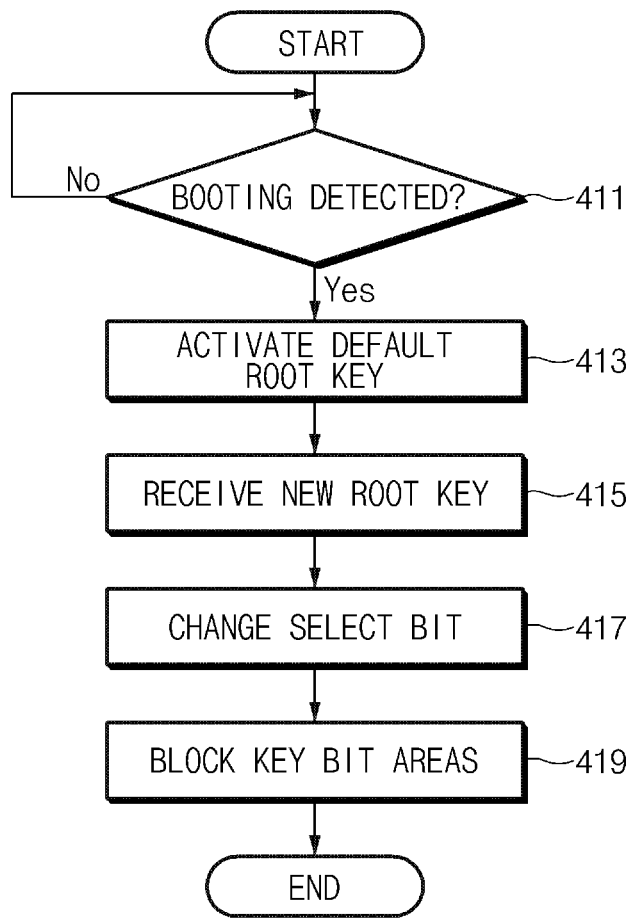
FIG. 4 is a flowchart illustrating a method for changing a root key according to an embodiment of the present invention.

FIG. 4 is a flowchart illustrating a method for changing authority for secure boot according to an embodiment of the present invention.

Referring to FIGS. 1 to 4, the processor core 110 detects booting of the system 100 in step 411. If the booting of the system 100 is detected in step 411, the processor core 110 activates the first root key in step 413. Here, the system 100 is set to be booted through the NW 111, and the first root key may correspond to a root key present in the uppermost area of the key bit areas 121, i.e., the root key area 121a.

In step 415, the processor core 110 receives a signal for changing the root key from the first root key to the second root key and receives the second root key.

The processor core 110 may receive, from the external device 300 (see FIG. 2), the second root key and the signal for changing the root key from the first root key to the second root key in step 415. Alternatively, the processor core 110 may receive, from the input device 151 (see FIG. 3), the signal for changing the root key from the first root key to the second root key, and receive the second root key generated in root key generation unit 250 (see FIG. 3) in step 415. Here, when the signal for changing the root key from the first root key to the second root key is received, the system 100 may activate the SW 113. The SW 113 may receive a new root key generated in the root key generation unit 310 of the external device 300 (see FIG. 2), or generated in root key generation unit 250 (see FIG. 3), i.e., the second root key. The SW 113 may write the received second root key in the blank_1 area 121b of the key bit areas 121. For example, the NW 111 may read a boot image in the nonvolatile memory 220, and may change the root key of the system 100 to the second root key through the SW 113.

In step 417, the SW 113 controls the select bit assigned to the select bit area 123 to select the second root key. For example, the processor core 110 may change the select bit to indicate another root key. In step 419, the processor core 110 controls the future bit assigned to the future bit area 125 to block the key bit areas blank_2 121c to blank_n 121n other than the blank_1 area 121b in which the second root key is written. In another embodiment of the present invention, step 419 may be selectively performed. For example, an OEM manufacturer may allow step 419 to be performed so that the root key is prevented from being replaced with another root key (e.g., a third root key).

Figure 5:
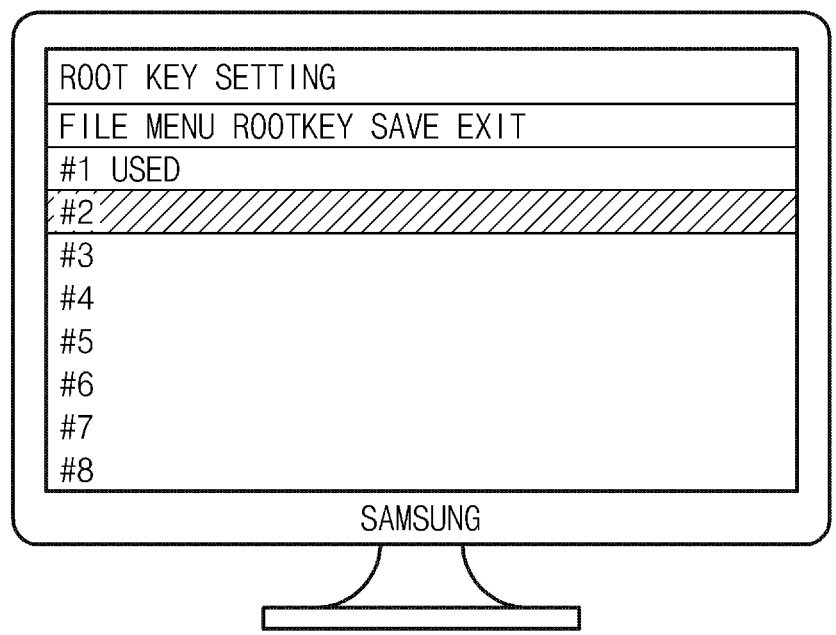
FIG. 5 illustrates an example of a screen that shows a root key change performed in an external device according to an embodiment of the present invention.

FIG. 5 illustrates an example of a screen that shows a root key change performed in an external device according to an embodiment of the present invention.

Referring to FIGS. 1, 2 and 5, when the control device 150 of FIG. 2 is connected to the external device 300, and a signal for changing the root key is input, a screen for setting the root key may be displayed on a display (as shown in FIG. 5) of the external device 300. On the display as shown in FIG. 5, the item #1 may represent the first root key, which was input to an upper area of the key bit areas 121 when a manufacturer of the system 100 manufactured the system 100. A unique root key may be assigned to the item #2. Here, the unique root key may be from an OEM manufacturer which has received the system 100 from the manufacturer of the system 100. When the external device 300 transfers a selection signal for selecting item #2 to the processor core 110, the processor core 110 may control the select bit assigned to the select bit area 123 of the memory 120 to select the blank_1 area 121b.

The key bit areas 121 of the memory 120 included in the system 100 are indexed to be expressed as the items #1, #2, and the like, displayed on the screen. Here, the root key area 121a corresponding to the item #1 is indicated as "USED" since the first root key has been written in the root key area 121a. Furthermore, if a manufacturer of OEM sets the bit areas corresponding to the items #3 to #8 so that these bit areas are blocked, the processor core 110 may allow the future bit assigned to the future bit area 125 of the memory 120 to block the blank_2 area 121c to the blank_n area 121n. In this manner, an OEM manufacturer may change the root key of the system 100, and may check what area of the key bit areas 121 is used by the manufacture of OEM.

Figure 6:
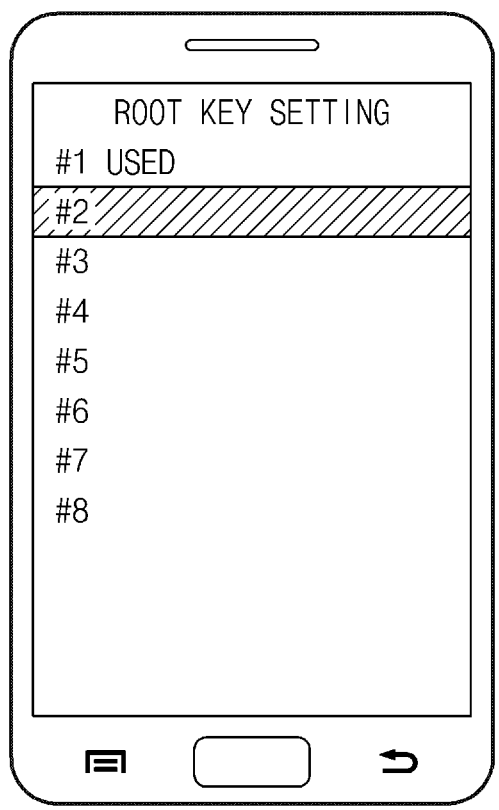
FIG. 6 illustrates an example of a screen that shows a root key change performed in an electronic device according to an embodiment of the present invention.

FIG. 6 illustrates an example of a screen that shows a root key change performed in an electronic device according to an embodiment of the present invention.

Referring to FIGS. 1, 3 and 6, when the electronic device 400 of FIG. 3 receives a signal for changing the root key from the outside via the input device 151, a screen (as shown in FIG. 6) for changing the root key may be displayed on the output device 153 of the electronic device 400. The screen may be associated with a factory reset mode. On the screen as shown in FIG. 6, the item #1 may represent the first root key, which was input to an upper area of the key bit areas 121 when a manufacturer of the system 100 included in the electronic device 400 manufactures the system 100. A unique root key may be written in the item #2. Here, the unique root key may be from an OEM manufacturer which has received the electronic device 400 including the system 100. When the electronic device 400 receives a selection signal for selecting the item #2, the processor core 110 may control the select bit assigned to the select bit area 123 of the memory 120 to select the blank_1 area 121b.

The key bit areas 121 of the memory 120 included in the system 100 are indexed to be expressed as the items #1, #2, and the like, displayed on the screen. Here, the root key area 121a corresponding to item #1 is indicated as "USED" since the first root key has been written in the root key area 121a. Furthermore, if a manufacturer of OEM sets the bit areas corresponding to the items #3 to #8 so that these bit areas are blocked, the processor core 110 may allow the future bit assigned to the future bit area 125 of the memory 120 to block the blank_2 area 121c to the blank_n area 121n. In this manner, an OEM manufacturer may change the root key of the system 100, and may check what area of the key bit areas 121 is used by the manufacture of OEM. When the electronic device 400 is booted after the change from the first root key to the second root key is completed as described above, the electronic device 400 may verify the secure boot chain using the second root key and then may operate an operating system installed in the electronic device 400.

As described above, according to an embodiment of the present invention, an OEM manufacturer may possess its own root of trust to change the secure boot chain, thereby improves the security of the secure boot changing system.

Furthermore, according to an embodiment of the present invention, since an OEM manufacturer may possess its own root of trust to change authority for secure boot operations, the provision of a B2B service may be enabled.

The above-described embodiments of the present invention are illustrative and not limitative. Various alternatives and equivalents are possible. Other additions, subtractions, or modifications are obvious in view of the present invention and are intended to fall within the scope of the present invention as defined by the appended claims and their equivalents.

What is claimed is:

1. A secure boot changing system comprising:
   a memory including a plurality of key bit areas and a select bit area, wherein one key bit area of the plurality of key bit areas stores a root key and the select bit area stores a select bit indicating the root key; and
   a processor core configured to input a new root key to one of remaining key bit areas and to change the select bit to indicate the new root key rather than the root key in response to an external input, and use the new root key indicated by the select bit during system booting,
   wherein the root key is automatically discarded when the new root key is indicated by the select bit.

2. The secure boot changing system according to claim 1, wherein the memory further includes a future bit area to which a future bit is assigned, the future bit blocking at least one of the plurality of key bit areas.

3. The secure boot changing system according to claim 2, wherein the processor core is further configured to control the select bit so as to select the new root key.

4. The secure boot changing system according to claim 3, wherein the processor core is further configured to control the future bit so as to block remaining key bit areas other than a key bit area corresponding to the selected new root key.

5. A secure boot changing method comprising:
   receiving, by a processor core, a new root key from an external input;
   inputting, by the processor core, the new root key to a first bit area of a plurality of key bit areas on a memory;
   changing, by the processor core, a select bit stored in a select bit area to indicate the new root key rather than an original root key stored in a second bit area of the plurality of key bit areas;
   using, by the processor core, the new root key indicated by the select bit during booting of a system in which the processor core included; and
   automatically discarding the root key when the net root key is indicated by the select bit,
   wherein the memory includes the plurality of key bit areas and the select bit area.

6. The secure boot changing method according to claim 5, comprising:
   controlling the select bit so as to select the new root key by the processor core, after inputting the new root key.

7. The secure boot changing method according to claim 6, comprising:
   blocking remaining key bit areas other than a key bit area corresponding to the selected new root key by the processor core, after controlling the select bit.

8. An electronic device comprising:
   a secure boot changing system including an original root key stored in a first key bit area of a plurality of key bit areas, the secure boot changing system being configured to:
   input a new root key to a second key bit area of the plurality of key bit areas in response to an external input, and
   change a select bit stored in a select bit area to indicate the new root key stored in the second key bit area; and
   a memory device configured to be booted with the new root key indicated by the select bit,
   wherein the root key is automatically discarded when the new root key is indicated by the select bit.

9. The electronic device according to claim 8, further comprising:
   a control device configured to operate in a normal mode for a booting operation with a preset root key, and switch to a secure mode according to the external input to generate the new root key.

10. The electronic device according to claim 9, wherein the control device is further configured to perform the booting operation with the new root key and switch to the normal mode.

11. A secure boot changing system comprising:
    a memory including a plurality of key bit areas and a select bit area, wherein a first root key is assigned to one of the key bit areas, and a select bit is assigned to the select bit area and is set to indicate the first root key; and
    a processor configured to assign a second root key to one of remaining key bit areas other than the one of the plurality of key bit areas assigned the first root key, and to control the select bit to indicate the second root key rather than the first root key,
    wherein the secure boot changing system verifies a secure boot chain of the secure boot changing system when the second root key is assigned to the memory, and
    wherein the first root key is automatically discarded when the second root key is indicated by the select bit.

12. The secure boot changing system according to claim 11, wherein the memory further includes a future bit area to which a future bit is assigned, the future bit blocking the remaining key bit areas other than the one of the remaining key bit areas assigned the second root key.

13. The secure boot changing system according to claim 12, wherein the processor is further configured to control the future bit so as to block the remaining key bit areas other than the one of the remaining key bit areas assigned the second root key.

* * * * *